United States Patent [19]

Swarup et al.

[11] Patent Number: 5,428,084
[45] Date of Patent: Jun. 27, 1995

[54] DEFUNCTIONALIZED EPOXY RESINS USEFUL IN COATINGS

[75] Inventors: Shanti Swarup; Ronald R. Ambrose, both of Hampton Township, Allegheny County, Pa.

[73] Assignee: PPG Industries, Inc., Pittsburgh, Pa.

[21] Appl. No.: 219,603

[22] Filed: Mar. 29, 1994

[51] Int. Cl.⁶ .......................... C08K 3/20; C08L 63/02
[52] U.S. Cl. .................................................... 523/414
[58] Field of Search ........................ 523/414, 417, 420

[56] References Cited

U.S. PATENT DOCUMENTS

| | | | |
|---|---|---|---|
| 3,716,402 | 2/1973 | Hicks | 427/386 |
| 4,174,333 | 11/1979 | Hartman et al. | 260/29.2 |
| 4,289,674 | 9/1981 | Christenson et al. | 260/29.6 |
| 4,335,829 | 6/1982 | Christenson et al. | 220/458 |
| 4,423,166 | 12/1983 | Moriarity et al. | 523/404 |
| 4,605,476 | 8/1986 | Hart et al. | 204/181.6 |

*Primary Examiner*—Melvyn I. Marquis
*Assistant Examiner*—D. Aylward
*Attorney, Agent, or Firm*—Dennis G. Millman; Paul S. Chirgott

[57] ABSTRACT

Amine defunctionalized epoxy resin for coating compositions particularly suitable for application onto metal surfaces such as can stock was found to have improved blush and stain resistance when employing reaction ratios near 1:1 equivalent of epoxy group to equivalent of primary amine or ammonia. A method is also disclosed for carrying out the defunctionalizing reaction while avoiding gelation.

5 Claims, No Drawings

DEFUNCTIONALIZED EPOXY RESINS USEFUL IN COATINGS

BACKGROUND OF THE INVENTION

The present invention relates to modified epoxy resins and the use thereof in resinous blends useful as waterbased coating compositions particularly suitable for can or coil coatings.

In the area of can coatings in particular, coatings intended for use in food and beverage industries generally are expected to meet a number of requirements in order to be commercially acceptable. The coating should adhere well to the base metal and should possess flexibility, extensibility and adhesion characteristics so as to withstand the processing of the container itself. The coating sometimes also must be able to resist heat which can be encountered during processing of the container and its contents. Additionally, the coating itself should not affect the taste of a food or beverage which is put into the coated container. Film continuity is another characteristic sought after, and one aspect of this requirement is that coatings be blister-free. Blistering is a defect that arises from gas by-products of curing the coating becoming trapped in the coating, and is a problem particularly associated with coated areas in which the coating is relatively thick. A coating that is prone to blistering requires special precautions to be taken during coating to assure that a maximum allowable coating thickness is not exceeded on any portion of the article being coated. In some cases line speed is limited by a tendency for a coating to blister. Another defect that is preferably avoided is blush, which is a haziness in the film believed to be caused by absorption of water. Blush is particularly evident with container coatings that are subjected to high temperature, high humidity conditions during a camping process.

The prior art typically used substantial excess amounts of amine or ammonia to defunctionalize epoxy resins intended for use in water dispersible compositions of the type involved here for the sake of maintaining relatively low molecular weight. It had been believed that using equivalent ratios close to 1:1 involved a risk of gelling the resin, rendering it useless for coating purposes. This approach, however, required costly collection arrangements to prevent discharge to the atmosphere when the excess amine or ammonia was subsequently driven from the defunctionalized product.

U.S. Pat. No. 4,605,476 (Hart et al.) discloses waterborne can coatings that comprise epoxy resins defunctionalized with an excess of ammonia or amine blended with acrylic copolymers that may incorporate N-(alkoxymethyl) acrylamide or methacrylamide. It would be desirable to utilize less ammonia or amine than employed in the approach of that patent. It would also be desirable to achieve improvements in process resistance in this type of coating.

U.S. Pat. No. 4,174,333 (Hartman et al.) discloses waterborne can coatings containing epoxy resins that have been defunctionalized with excess ammonia or amine and have been reacted with an anhydride. The same improvements would be desirable as mentioned with the previous patent.

SUMMARY OF THE INVENTION

Whereas the closest prior art typically used substantial excesses of ammonia and/or amine to defunctionalize polyepoxides for use in water dispersible coatings of the type disclosed here, the present invention uses close to a 1:1 ratio of equivalents of epoxy groups to equivalents of ammonia or amine. The equivalent ratio may range from 1:1.5 to 1.5:1, preferably from 1:1.3 to 1.3:1. Not only does this substantially reduce the extent to which emissions of excess amine or ammonia need to be collected, but surprisingly it has been found that coating compositions containing defunctionalized epoxies in accordance with the present invention exhibit improved blush and stain resistance when subjected to high temperature processing conditions. Additionally, adhesion to metallic substrates of the coatings of the present invention is sufficiently good that pretreatments prior to coating (e.g., pretreatment with chromium compounds) to which aluminum substrates have typically been subjected can be dispensed with when using the coatings of the present invention.

The present invention additionally encompasses a coating composition comprising as an essential film-former a resinous blend of:

(i) 5 to 95 weight percent of the reaction product of (a) a polyepoxide, and (b) a member selected from the group consisting of amines, ammonia, and mixtures thereof, wherein the ratio of equivalents of (a) to equivalents of (b) is in the range of 1.5:1 to 1:1.5; and (ii) from about 5 to 95 percent by weight of a vinyl addition copolymer produced from an acid group-containing monomer.

The percent by weight values set forth above and throughout this description, unless specifically noted otherwise, are based on resin solids content relative to total resin solids content. The coating compositions additionally may contain curing agents such as aminoplasts, phenolic resins, and/or urea-formaldehyde resins. The coatings obtained therefrom are continuous films which have excellent film properties.

The invention also involves a method of defunctionalizing a polyepoxide comprising: dissolving a polyepoxide in solvent; introducing ammonia, an amine, or a mixture thereof into the polyepoxide solution so as to react therewith while maintaining temperature below 60° C. for a period of at least one hour. By this process the ratios near 1:1 described above may be attained without gelation.

DETAILED DESCRIPTION OF THE INVENTION

Epoxy Resins

The amine-defunctionalized epoxy resin of the present invention may be prepared by reacting a polyepoxide resin with ammonia or an amine having at least two active hydrogen atoms. The polyepoxide resin useful herein is a compound or a mixture of compounds having more than 1.0 epoxy groups per molecule.

A preferred class of polyepoxides are the polyglycidyl ethers of polyphenols, such as bisphenol A. These are produced by etherification of a polyphenol with epichlorohydrin in the presence of an alkali. The phenolic compound can be 2,2-bis(4-hydroxyphenyl)propane; 1,1-bis(4-hydroxyphenyl)ethane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; and 1,1-bis(4-hydroxy-3-allylphenyl)ethane. Another quite useful class of polyepoxides are produced similarly from polyphenol resins.

Also suitable are the similar polyglycidyl ethers of polyhydric alcohols which are derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, and 2,2-bis(4-hydroxycyclohexyl)propane.

Cycloaliphatic polyepoxide resins can also be used. Such resins are prepared by epoxidation of cyclic olefins with organic peracids, e.g. peracetic acid.

In addition to the polyepoxide resins described above, addition polymerization polymers containing pendent epoxy groups are also utilized in this invention. Such polymers are made by copolymerizing a wide variety of polymerizable vinyl monomers including monomers such as glycidyl acrylate and glycidyl methacrylate. Suitable vinyl monomers include those which do not contain a group reactive with the epoxy group and preferably include the alpha, beta-ethylenically unsaturated carboxylic acid esters of saturated alcohols containing from 1 to 8 carbon atoms and the monovinyl aromatic monomers of the benzene class, e.g., styrene and vinyl toluene.

In order to defunctionalize the epoxy groups, the polyepoxide resin is preferably reacted with ammonia. The ammonia may be provided in gaseous form or in aqueous solution as ammonium hydroxide. As used herein, "ammonia" is intended to include ammonium solutions. Amines may be used for defunctionalization, but are not preferred for the sake of attaining the adhesion advantages of the preferred embodiments of the present invention. However, some of the adhesion improvements can be attained using combinations of ammonia and amine, provided that the amine constitutes a minor portion. Amines that are suitable for defunctionalizing the epoxy are those having at least 2 active hydrogen atoms. The active hydrogen atoms can be on the same nitrogen atom, e.g., the primary amines or on different nitrogen atoms in a compound, e.g., di- or polyamines wherein the active hydrogen atoms can be on the same nitrogen atom, or on two or more nitrogen atoms. Examples of suitable primary amines include ethylamine, propylamine, isopropylamine and butylamine. Suitable di- and polyamines include hydrazine, ethylene diamine, propylene diamine, butylene diamine, hexylene diamine, diethylene triamine, tetraethylene pentamine, N-methylethylene diamine, N-methylbutylene diamine, N,N-dimethylethylene diamine, N,N-dipropylethylene diamine, and N,N-dimethylhexylene diamine.

The reaction of the polyepoxide resin with the ammonia or amine involves a ring opening reaction where the resultant ungelled product is the amine-terminated product of a polyepoxide resin. It is desired that substantially all of the 1,2-epoxy groups contained in the polyepoxide resin be reacted with the ammonia or amine. For this reason the prior art typically employs a molar excess of the ammonia or amine to epoxy groups in the epoxy defunctionalization reaction, and to avoid gelation the prior art typically used a substantial excess of amine or ammonia. However, with the present invention, it is preferred to use a molar ratio at or near 1:1 for the sake of minimizing the amount of excess volatile ammonia or amine that needs to be captured in the manufacturing facility. Ratios from 1.5:1 to 1:1.5 may be considered within the scope of the present invention. With the preferred embodiments the ratios are within the range of 1.3:1 to 1:1.3. The reaction of the polyepoxide resin with the ammonia or amine is carried out under controlled conditions in order to avoid gelation without requiring undue amounts of thinning with organic solvent that would need to be removed subsequently. Reaction between the epoxy and the amine is carried out at relatively low temperatures (below 60° C.) over a relatively long period of time (at least one hour). It is believed that under these reaction conditions it is substantially only primary amines that are reacted.

A solvent or mixture of solvents is preferably included in the reaction of the epoxy resin and ammonia or amine for the purpose of achieving better reaction control. Any nonreactive solvent can be used, examples of which include the ketones and alcohols. Specific examples of suitable solvents are methyl ethyl ketone, methyl butyl ketone, ethanol, propanol, isopropanol and butanol.

Vinyl Addition Resins

The defunctionalized epoxy resins have been found to be useful for coating compositions, particularly when blended with other resins, an example of which is a vinyl addition copolymer resin. The preferred vinyl addition copolymer resins can be formed by polymerizing from about 5 percent to about 25 weight percent of an alpha, beta ethylenically unsaturated carboxylic acid with from about 75 percent to about 95 percent of at least one other copolymerizable vinyl monomer or monomers. The resulting copolymers have an acid value of from about 20 to about 350, preferably from about 45 to about 150. Preferred vinyl addition resins are formed from about 7 percent to about 15 percent of the alpha, beta-ethylenically unsaturated carboxylic acid and from about 85 percent to about 93 percent of the other copolymerizable vinyl monomer. Examples of suitable alpha, beta-ethylenically unsaturated carboxylic acids are those containing from 3 to 8 carbon atoms such as acrylic acid and methacrylic acid, both of which are preferred. Acids such as itaconic acid, maleic acid, fumaric acid, mono-esters of unsaturated dicarboxylic acids, e.g., methyl hydrogen maleate and ethyl hydrogen fumarate as well as anhydrides where they exist, may also be used.

The other copolymerizable vinyl monomer or monomers for the vinyl addition resin copolymerization may be selected from a wide variety of materials depending upon the properties desired. For example, at least a portion of the other copolymerizable monomer may be a vinyl aromatic compound such as styrene, alpha-methyl styrene, tertiary butyl styrene, vinyl toluene and vinyl xylene. Such monomers are preferred because of their good water and pasteurization resistance. Additional monomers which may be used are the alkyl esters of methacrylic acid which contain from 1 to 3 carbon atoms in the alkyl group. Specific examples of such esters are methyl methacrylate and ethyl methacrylate. Monomers which may be used and which provide flexibility to the coatings are the alkyl esters of acrylic acid having from 2 to 17 carbon atoms in the alkyl group and alkyl esters of methacrylic acid having from 4 to 17 carbon atoms in the alkyl group. Examples of monomers of this type are ethyl acrylate, propyl acrylate, butyl acrylate, hexyl acrylate, 2-ethyl-hexyl acrylate, butyl methacrylate, 2-ethyl-hexyl methacrylate, lauryl methacrylate, and stearyl methacrylate. Still other monomers include vinyl monomers such as ethylene, propylene and the like, the vinyl halides, vinylidene halides, vinyl versatate, vinyl acetate, dialkyl maleate, allyl chloride, allyl alcohol, 1,3-butadiene, 2-chlorobutene, methyl vinyl ether, acrylamide, methacrylamide, acrylonitrile, and methacrylonitrile. Mixtures of any of the above-described vinyl monomers may be used and are preferred. Mixtures of vinyl addition resins formed separately can also be used.

Additional monomers may be included in the vinyl addition copolymerization. A preferred example of a third monomer included in the vinyl addition copolymer resin is an N-(alkoxymethyl)acrylamide or N-(alkoxymethyl)methacrylamide having 1 to 4 carbon atoms in the alkoxy group. The preferred member of this group is N-(butoxymethyl)methacrylamide. Examples of other members include N-(butoxymethyl)acrylamide and N-(ethoxymethyl)acrylamide. These acrylamide monomers may be included in amounts typically in the range of 10 to 50 weight percent of the monomer mixture.

Vinyl addition resins described above can be prepared by free radical initiated polymerization of a mixture of the copolymerizable acrylic monomers by solution polymerization techniques. Usually, the monomers are dissolved in a solvent or a mixture of solvents and polymerized until the free monomeric content is reduced to below about 0.5 percent, preferably below about 0.1 percent. Examples of free radical initiators include azobis(alpha-gamma)-dimethylvaleronitrile, tertiary-butyl perbenzoate, tertiary-butyl peracetate and benzoyl peroxide. Usually, the solvent is first heated to reflux and a mixture of the monomers and the free radical initiator are added simultaneously and slowly to the refluxing solvent. Additional catalyst is optionally added and the reaction mixture held at polymerizing temperatures so as to reduce the free monomer content of the reaction mixture.

The copolymerization is carried out in the presence of a solvent. As disclosed and claimed in copending, commonly owned U.S. patent application Ser. No. 08/219,322 filed on even date herewith by Shanti Swamp, Ronald R. Ambrose, James B. O'Dwyer, and Lawrence J. Fitzgerald, advantages in application latitude may be obtained by including a polyol in the solvent, wherein the polyol molecule includes OH groups of different reactivity. It has been found that an increase in coating thickness latitude results when the copolymerization is carried out in the presence of an alcohol solvent reactive with the acrylamide groups that are preferably included in the vinyl addition copolymer. Polyols have been found to be substantially more reactive in this regard than mono-alcohols. However, the use of many polyols leads to unacceptable molecular weight increase, in some cases resulting in gellation which renders the resin useless for the intended purpose. To avoid gellation, the polyols useful for this purpose are those which are characterized by OH groups having differing reactivity with regard to the acrylamide groups. In other words, the polyols preferably include combinations of a primary OH group, a secondary OH group, or a tertiary OH group, but avoid having two or more primary OH groups, two or more secondary OH groups, or two or more tertiary groups. Preferably, the polyol includes one primary OH group and one secondary OH group, examples of which include propylene glycol (1,2-propanediol), 1,3-butanediol, 1,2-octanediol, 2-methyl-2,4-pentanediol, and 2,2,4-trimethyl-1,3-pentanediol. An example of a suitable polyol having a combination of a primary, secondary, and tertiary alcohol is 3-methyl-1,2,3-hexanetriol. The use of analogous higher homologs of these polyols is also contemplated. Preferably, the entire alcohol content of the solvent consists of one or more of the polyols characterized above, but some monoalcohol may be included without detracting significantly from the advantages of the present invention. Other non-alcohol solvents may be mixed with the polyol. Examples of non-alcoholic solvents that may be used with the polyols include ketones such as acetone, methyl ethyl ketone, and methyl isobutyl ketone. The solvents used for the copolymerization step are either water-soluble or water miscible. Moderate levels of water-insoluble solvents such as toluene or xylene may also be used. The polyols having OH groups of different reactivity as described above comprise at least 5 percent by weight of the total solvent used during the vinyl addition copolymerization, preferably at least 20 percent, most preferably at least 50 percent.

Coating Compositions

The coating compositions of the preferred embodiments comprise resinous blends having from about 5 percent to about 95 percent, preferably from about 20 percent to about 75 percent, of the vinyl addition resin and from about 5 percent to about 95 percent, preferably from about 20 percent to about 75 percent, of the defunctionalized epoxy resin. The solids content of the compositions range from about 20 percent to about 60 percent with the balance of the composition comprising water, organic solvent, or a mixture of water and organic solvent. Compositions wherein water is the major liquid carrier are preferred.

The resinous blends are prepared from the aforedescribed vinyl addition resins and defunctionalized epoxy resins in alternative ways. In one alternative, the vinyl addition resins and modified epoxy resins are separately made. In adapting the resinous blend to water-based compositions useful herein, the acid group containing vinyl addition copolymer is at least partially neutralized with a base either before or after blending with the modified epoxy resin, and subsequently water is added to form the coating composition. The bases useful herein can be organic or inorganic. Illustrative examples of the bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, diisopropanolamine, dimethylethanolamine and diethylethanolamine; morpholine; and inorganic hydroxides such as potassium and sodium hydroxide. Usually, the pH of the final aqueous dispersion is adjusted to 7 to 10, preferably less than 9. The percent of neutralization is such as would make the resinous blends water-dispersible. The resinous blend may be partially neutralized from 20 percent up to 95 percent based on acid groups in the vinyl addition copolymer. Additional improvements to coating application latitude have been found from partially neutralizing the carboxyl group content of the resin blend, e.g., less than 65 percent, preferably less than 50 percent, and this feature is the subject matter of commonly owned, co-pending U.S. patent application Ser. No. 08/219,601 filed on even date herewith by Shanti Swamp, Ronald R. Ambrose, and Lawrence J. Fitzgerald.

An alternative way to prepare the resinous blends comprises blending the vinyl addition resin with the polyepoxide resin and then reacting the epoxide groups with ammonia or amine.

It is often desirable in order to get a more durable film to add an external crosslinking agent to the above-described coating compositions. Examples thereof include the aminoplast resins, phenoplast resins, and isocyanates, preferably blocked polyisocyanates. The level of crosslinking agent used as part of the film-forming resin may range up to about 40 percent, and is preferably from about 5 percent to about 20 percent of the film-forming resin. While vinyl addition resins derived from N-(alkoxymethyl)methacrylamide and N-(alkoxymethyl)acrylamide are capable of crosslinking without an external crosslinking agent, such agents may, nevertheless, be added.

Aminoplast resins are the condensation products of an aldehyde, e.g., formaldehyde, acetaldehyde, crotonaldehyde, and benzaldehyde, with an amino- or amido group-containing substance, e.g., urea, melamine, and benzoguanamine. Products obtained from the reaction of alcohols and formaldehyde with melamine, urea or benzoguanamine are preferred in the aqueous-based coating compositions because of their good water dispersibility. Useful alcohols used to make the etherified products are the monohydric alcohols, such as methanol, ethanol, propanol, butanol, hexanol, benzyl alcohol, cyclohexanol, and ethoxyethanol. An etherified melamineformaldehyde resin is the preferred aminoplast resin.

Phenolic resins include the condensation product of an aldehyde with a phenol. Formaldehyde and acetaldehyde are preferred aldehydes. Various phenols can be used, e.g., phenol, cresol, p-phenylphenol, p-tert-butylphenol, p-tert-amylphenol and cyclopentylphenol.

A number of blocked polyisocyanates are satisfactory crosslinking agents. These agents are well known in the art. Generally, the organic polyisocyanates are blocked with a volatile alcohol, epsilon-caprolactam or ketoxime. These blocked polyisocyanates become unblocked at elevated temperatures, e.g., above about 100° C.

The coating compositions of this invention may contain other optional components such as pigments, fillers, anti-oxidants, flow control agents, surfactants and the like.

The coatings of the present invention have been found to possess particular advantages when utilized on high speed roll coating lines for coating sheet aluminum stock intended for containers, but the coatings could be applied onto any substrate, particularly metallic substrates, by any conventional process. The coatings may also be adapted for electrodeposition. Typically, the coatings are cured at elevated temperatures on the order of 200° C. to 300° C.

THE EXAMPLES

Set forth hereinafter are comparisons of embodiments of the invention and embodiments outside the scope of the invention. Examples A1 through A5 disclose vinyl addition copolymerization procedures for preferred embodiments of water dispersible acrylic resin to be blended with the defunctionalized epoxy resins of the present invention. In Example E1, an extended epoxy resin is disclosed which may be blended with the vinyl addition copolymers. Examples D1 through D6 disclose defunctionalization of the epoxy resin of Example E1 with varying amounts of ammonia, blending the defunctionalized epoxy with the vinyl addition copolymers of Examples A1 to A5, and dispersion of the blends into water. These dispersions were then incorporated into coating formulations as set forth in Examples F1 through F6. These coating formulations were tested for blush resistance, discoloration, blistering, and loss of adhesion, and the results are set forth in Table 1.

EXAMPLE A1

An acid group containing vinyl addition resin was prepared as follows:

| Ingredients | Parts by Weight |
|---|---|
| Flask Charge | |
| Methyl ethyl ketone | 160.5 |
| Propylene glycol | 1702.0 |
| Shellmax ® wax* | 175.0 |
| Monomer Charge | |
| N-(butoxymethyl)acrylamide** | 2133.5 |
| Butyl acrylate | 437.5 |
| Acrylic acid | 503.0 |
| Styrene | 2122.5 |
| Initiator Charge | |
| Benzoyl peroxide** | 109.0 |
| Methyl ethyl ketone | 537.5 |
| Initiator (Scavenger) Charge | |
| Benzoyl peroxide*** | 39.0 |
| Methyl ethyl ketone | 300.0 |
| Thinning Solvent | |
| Methyl ethyl ketone | 1546.5 |

*Shellmax wax is a highly refined petroleum wax of long chain saturated hydrocarbon molecules available from Shell Chemical Company. It is 100 percent solids.
**N-(butoxymethyl)acrylamide is 55.4% solids in 8% xylene and 36.6% n-butanol.
***Benzoyl peroxide is 78% solids in water.

The flask charge was taken into a 5 liter round bottom flask equipped with stirrer, dropping funnel, thermometer, condenser and a nitrogen inlet. The mixture was heated to reflux at 140° C. The monomer and initiator charges were fed simultaneously to the reaction mixture over a period of 4 hours. Upon completion of these additions, the initiator (scavenger) charge was added in three equal portions. After each addition, the reaction mixture was held for 1.5 hours. The resulting product was cooled below 60° C., followed by the addition of thinning solvent. The product was stored at room temperature. Analysis of the product was as follows: theoretical solids 46%, viscosity 3275 centipoise (Brookfield viscometer with number 4 spindle at 20 rpm), propylene glycol content 14.56% as measured by gas chromatography (theoretically 17.36%), acid equivalent 1403.0 as measured by base titration (theoretically 414.0), and weight average molecular weight of 70,000

Example A2

Same as example A1, except that methyl ethyl ketone was replaced with propylene glycol in the thinning charge. Analysis: theoretical solids of 46%, viscosity of 13,380 centipoise, and weight average molecular weight of 169,344.

Example A3

Same as example A1, except that propylene glycol was replaced with butyl Carbitol ® (butyl ether of diethylene glycol, available from Union Carbide) in the flask charge. Analysis: theoretical solids 46%, viscosity 16,320 centipoise, butyl Carbitol ® content 12.99%, propylene glycol 14.01 by gas chromatography, weight average molecular weight about 130,000.

Example A4

Same as example A1, except that methyl ethyl ketone was replaced with Propasol ® P (propyl ether of propylene glycol available from Union Carbide) in the thinning charge. Analysis: Theoretical solids of 46%, and viscosity of 4380 centipoises.

Example A5

Same as example A1, except that methyl ethyl ketone was replaced with Propasol ® B (butyl ether of propylene glycol available from Union Carbide) in the thinning charge. Analysis: theoretical solids 46%, viscosity 5380 centipoises.

Example E1

A modified epoxy functional resin, was prepared as follows:

| Ingredient | Parts by weight |
| --- | --- |
| Charge 1 | |
| EPON ® 828 epoxy resin* | 1704.1 |
| Xylene | 23.8 |
| Bisphenol A | 820.0 |
| Charge 2 | |
| Ethylenetriphenylphosphonium iodide | 1.7 |
| Xylene | 92.8 |
| Charge 3 | |
| Butyl Carbitol ®** | 325.6 |
| Methyl ethyl ketone | 703.0 |
| Butanol | 326.2 |

*EPON ® 828 is an epoxy functional resin (epoxy equivalent weight available from Shell Chemical Company.
**Butyl Carbitol ® is butyl ether of ethylene glycol available from Union Carbide.

The charge 1 was taken into a 5 liter flask and heated to 105°–110° C. The contents of the flask were held at this temperature for 30 minutes or until dissolved. When dissolved, charge 2 was added, and the mixture was heated to 135° C. The reaction mixture was then allowed to exotherm to 160°–190° C. and then held for 1.5 hour at 160° C. Following the hold period, the product was allowed to cool to 90° C. Charge 3 was added and the product was cooled and stored at room temperature. The polymerized epoxy resin had epoxy equivalent weight of about 1450, and theoretical solids of 65%.

Example D1

Defunctionalization of the epoxy groups of the modified epoxy resin E1 with excess ammonia (epoxy to ammonia equivalent ratio of 1:4.5) as in the prior art, mixing with the vinyl addition copolymerized (acrylic) polymer of Example A1, and dispersing the mixture in water was done as follows:

| Charge No. | Ingredient | Parts by weight |
| --- | --- | --- |
| 1 | Modified epoxy of Example E1) | 1,750.1 |
| 2 | Ammonium hydroxide (28% aqueous) | 205.4 |
| 3 | Acrylic polymer (example A1) | 1,112.3 |
| 4 | Dimethylethanol amine (DMEA) | 43.6 |
| 5 | Deionized water | 474.3 |
| 6 | Deionized water | 837.1 |

Charge 1 was taken in to a 5 liter round bottom flask, and heated to 35°–37° C. Charge 2 was then added sub-surface over 15 minutes. The contents of the flask were heated to 55° C. over 30 minutes and held at this temperature for 2 hours. The excess ammonia and some solvents from the modified epoxy were distilled (119 parts total distillate) while keeping the temperature in the range of about 80° C. to 90° C. Charge 3 was then added to the flask, and the contents were mixed for 30 minutes. Some solvents of the acrylic polymer were distilled (430 parts total distillate) by heating the contents to 110° C. Charge 4 was then added, and the contents were held for 15 minutes. Charges 4 and 5 were added over 90 and 120 minutes, respectively. The product was cooled and stored at room temperature. Analysis: The reaction product had a solids content of 46%, viscosity of 500 centipoises, pH of 8.3, particle size of about 9660 Å. 39.0% of the acidic groups were neutralized with dimethylethanolamine.

Example D2

Defunctionalization of the epoxy groups of the modified epoxy resin E1 with a small excess ammonia (epoxy to ammonia equivalent ratio of 1:1.5) in accordance with a non-preferred embodiment of the present invention, mixing with the vinyl addition copolymerized (acrylic) polymer of Example A1, and dispersing the mixture in water was done as follows:

| Charge No. | Ingredient | Parts by weight |
| --- | --- | --- |
| 1 | Modified epoxy (Example E1) | 1337.50 |
| 2 | Ammonium hydroxide (29% aqueous) | 54.5 |
| 3 | Acrylic polymer (Example A1) | 850.0 |
| 4 | Dimethylethanol amine (DMEA) | 13.3 |
| 5 | Deionized water | 738.5 |
| 6 | Deionized water | 416.5 |

Charge 1 was taken in to a 5 liter round bottom flask, and heated to 35°–37° C. Charge 2 was then added sub-surface over 15 minutes. The contents of the flask were heated to 55° C. over 30 minutes and held at this temperature until the epoxy equivalent became infinite (4 to 6 hours). Charge 3 was then added to the flask, and the contents were mixed for 30 minutes, followed by the addition of Charge 4. Charge 5 was added over 2 hours, followed by the addition of charge 6. The reaction mixture was then heated to reflux and 300 grams of solvents were distilled off. The product was cooled below 40° C. and stored at room temperature. Analysis: The reaction product had a theoretical solids content of 42%, viscosity of 1890 centipoises, pH of 8.59, particle size of about 4040 Å. 39.0% of the acidic groups were neutralized with dimethylethanolamine.

Example D3

In this example a small excess of ammonia was again employed (epoxy to ammonia equivalent ratio of 1:1.5). The dispersion was prepared in the same way as in Example D2, except that the polymer of Charge 3 was replaced with the product of Example A2. The resulting polymeric dispersion was unstable, and separated into two layers.

Example D4

In this example the epoxy to ammonia equivalent ratio was 1:1 in accordance with the preferred practice of the present invention. The dispersion was prepared in the same way as in the example D2, except that the amount of ammonium hydroxide was reduced to 36.4 grams and the polymer of Charge 3 was replaced with the product of Example A3. The resulting polymeric dispersion had particle size of 6100 Å, viscosity of 995 centipoises, pH of 7.85 and theoretical solids of 42%.

Example D5

In this example the epoxy to ammonia equivalent ratio was 1:1 in accordance with the preferred practice of the present invention. The dispersion was prepared in the same way as in Example D4, except that the polymer of Charge 3 was replaced by the product of Example A4. The resulting polymeric dispersion had viscosity of 800 centipoises, pH of 7.9, and solids of 39.2%.

Example D6

In this example the epoxy to ammonia equivalent ratio was 1:1 in accordance with the preferred practice of the present invention. The dispersion was prepared in the same way as in Example D4, except that the polymer of Charge 3 was replaced by the product of Example A5. The resulting polymeric dispersion had viscosity of 1090 centipoises, pH of 8.0, and solids content of 39.0%

Comparative Dispersions

The same procedure as Examples D1 through D6 was used, first with a 1:1 ratio of epoxy to ammonia equivalents, and then with a 1:1.5 ratio of epoxy to ammonia equivalents, except that the reaction in both cases was carried out at a higher temperature of 65° C. In both cases the product gelled during the epoxy defunctionalization reaction.

Coating Formulations

The polymeric dispersions described in Examples D1 through D6 were combined with additional film formers, such as phenolic resins and/or urea-formaldehyde resins, and water to produce coatings formulations F1 through F6. The amounts of the additional film formers used is not critical, but typically each may be present in amounts of 0–10%, preferably 0–3%, by weight on a resin solids basis. In each of the following examples F1 through F6, the urea-formaldehyde resin is "Beetle 80," an etherified, butylated urea-formaldehyde from American Cyanamid, and the phenolic resin is "Uravar FB209," a 57% solids solution in butanol and toluene from DSM Resins. These formulations were subsequently reduced to application viscosity, typically 15–25 seconds in a #4 Ford cup, with additional water prior to evaluation for application characteristics.

Example F1

| Ingredients | Parts by Weight |
| --- | --- |
| Epoxy-acrylic dispersion (Example D1) | 153.5 |
| Urea-formaldehyde resin | 2.2 |
| Phenolic resin solution | 3.6 |
| Deionized water | 16.5 |

Example F2

| Ingredients | Parts by Weight |
| --- | --- |
| Epoxy-acrylic dispersion (Example D2) | 150.0 |
| Urea-formaldehyde resin | 2.2 |
| Phenolic resin solution | 3.6 |
| Deionized water | 20.0 |

Example F3

Not evaluated due to separation of the dispersion of Example D3.

Example F4

| Ingredients | Parts by Weight |
| --- | --- |
| Epoxy-acrylic dispersion (Example D4) | 153.5 |
| Urea-formaldehyde resin | 2.2 |
| Phenolic resin solution | 3.6 |
| Deionized water | 16.5 |

Example F5

| Ingredients | Parts by Weight |
| --- | --- |
| Epoxy-acrylic dispersion (Example D5) | 168.2 |
| Urea-formaldehyde resin | 2.2 |
| Phenolic resin solution | 3.6 |
| Deionized water | 1.5 |

Example F6

| Ingredients | Parts by Weight |
| --- | --- |
| Epoxy-acrylic dispersion (Example D6) | 169.3 |
| Urea-formaldehyde resin | 2.2 |
| Phenolic resin solution | 3.6 |
| Deionized water | 0.4 |

PERFORMANCE TESTING

The formulations of Examples F1 through F6 were adjusted to a common solids content of 40% and applied by wire-wound drawdown bar to commercially pretreated aluminum sheet stock. To increase the severity of the test, these coatings were applied onto non-pretreated aluminum substrate. Cure was accomplished in a gas-fired oven by baking the panels to a 465° F. (240° C.) peak metal temperature. Each coated panel was then sealed in a container filled with Gatorade ® sports drink and processed for one hour in a steam retort at 250° F. (121 ° C.). The panels were then evaluated for adhesion by the crosshatch tape test and evaluated for blush, discoloration, blistering, and loss of adhesion.

The crosshatch tape adhesion test was carried out as follows: the coating was scribed with eleven parallel cuts through the film approximately 1/16 inch (1.6 millimeters) apart. Eleven similar cuts are made at 90 degrees to and crossing the first eleven cuts. Adhesive tape is applied over the area of cuts by pressing down firmly against the coating to eliminate voids and air pockets. Then the tape is sharply pulled off at a right angle to the plane of the coated surface. Adhesion is reported as the percentage of squares remaining on the substrate in the scribed area.

For comparison purposes, the same test was perforated with a commercially available vinyl resin based coating formulation (Comparative Formulation) which is an industry standard coating for aluminum can end stock. The comparative coating was applied onto a pretreated aluminum substrate, which would be expected to yield better adhesion and blush results than an untreated substrate. The results are reported in Table 1.

TABLE I

| Example | Epoxy/NH₃ Ratio | Molecular Weight | Gatorade Process Resistance (60 minutes at 250° F.) |
| --- | --- | --- | --- |
| Comparative | | | Heavy blush, stain, no tapeoff |
| F1 (A1 acrylic) | 1:4.6 | 22,000 | Slight blush, slight stain, no tapeoff |
| F2 (A1 acrylic) | 1:1.5 | 38,000 | Very slight blush, no stain, 5% tapeoff |
| F3 (A2 acrylic) | 1:1.5 | | No test (dispersion D3 unstable) |
| F4 (A3 acrylic) | 1:1.0 | 65,000 | No blush, no stain, no tapeoff |
| F5 (A4 acrylic) | 1:1.0 | | No blush, no stain, no tapeoff |
| F6 (A5 acrylic) | 1:1.0 | | No blush, no stain, no tapeoff |

Surprisingly, all of the acrylic/defunctionalized epoxy coatings (Examples F1 through F6) exhibited better blush and stain resistance than the commercial vinyl-based coating, even though the latter was applied onto a pretreated surface. The Table 1 data show that reducing the amount of ammonia in the defunctionalizing step improved performance even further. The examples that included epoxy resin defunctionalized without excess ammonia (Examples F4, F5, and F6) exhibited the best blush and stain resistance.

The invention has been disclosed herein with reference to particular embodiments for the sake of disclosing the best mode of carrying out the invention, but it should be understood that other variations and modifications as are known to those of skill the art may be resorted to without departing from the scope of the invention as defined by the claims which follow.

What is claimed is:

1. A method of defunctionalizing a polyepoxide to form an ungelled reaction product, said method comprising:
    (a) reacting ammonia with polyepoxide, in a reaction mixture comprising a solvent, at a ratio of equivalents of epoxy groups in the polyepoxide to equivalents of ammonia in the range of 1.5:1 to 1:1.5; and
    (b) during step (a), maintaining the reaction mixture temperature below 60° C. for a period of at least one hour so as to react substantially all epoxy functionality without gelation.

2. The method of claim 1 wherein the ratio of equivalents of epoxy groups in the polyepoxide to equivalents of ammonia is in the range of 1.3:1 to 1:1.3.

3. The method of claim 1 wherein the ratio of equivalents of epoxy groups in the polyepoxide to equivalents of ammonia is substantially 1:1.

4. The method of claim 1 wherein said ammonia is provided in a gaseous form, in an aqueous form, or in a combination of both forms.

5. The method of claim 1 wherein said ammonia is provides as ammonium hydroxide.

* * * * *